(12) United States Patent
Taghavi Nasrabadi et al.

(10) Patent No.: US 12,219,118 B1
(45) Date of Patent: Feb. 4, 2025

(54) METHOD AND DEVICE FOR GENERATING A 3D RECONSTRUCTION OF A SCENE WITH A HYBRID CAMERA RIG

(71) Applicant: Apple Inc., Cupertino, CA (US)

(72) Inventors: Afshin Taghavi Nasrabadi, Santa Clara, CA (US); Maneli Noorkami, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 535 days.

(21) Appl. No.: 17/678,815

(22) Filed: Feb. 23, 2022

Related U.S. Application Data

(60) Provisional application No. 63/159,342, filed on Mar. 10, 2021.

(51) Int. Cl.
*H04N 13/25* (2018.01)
*G06T 15/00* (2011.01)
*G06T 19/00* (2011.01)
*G06T 19/20* (2011.01)

(52) U.S. Cl.
CPC ............. *H04N 13/25* (2018.05); *G06T 15/00* (2013.01); *G06T 19/006* (2013.01); *G06T 19/20* (2013.01)

(58) Field of Classification Search
CPC ....... H04N 13/25; G06T 15/00; G06T 19/006; G06T 19/20
See application file for complete search history.

(56) References Cited

U.S. PATENT DOCUMENTS

| 9,832,452 B1* | 11/2017 | Fotland ................. G06F 3/0304 |
| 10,290,049 B1 | 5/2019 | Xu et al. |
| 2013/0027516 A1* | 1/2013 | Hart ...................... A61B 5/0071 348/45 |
| 2020/0372718 A1 | 11/2020 | Molyneaux et al. |
| 2021/0082185 A1* | 3/2021 | Ziegler ................... G06T 15/50 |
| 2022/0156955 A1* | 5/2022 | Doyen ................... H04N 19/85 |
| 2024/0004542 A1* | 1/2024 | Krishnamurthy ....... G06F 3/017 |

FOREIGN PATENT DOCUMENTS

GB    2572996 A    10/2019

* cited by examiner

*Primary Examiner* — Molly Wilburn
(74) *Attorney, Agent, or Firm* — Fernando & Partners, LLP; Prateek Bhatnagar

(57) ABSTRACT

In one implementation, a camera rig comprises: a first array of image sensors arranged in a planar configuration, wherein the first array of image sensors is provided to capture a first image stream from a first perspective of a physical environment; a second array of image sensors arranged in a non-planar configuration, wherein the second array of image sensors is provided to capture a second image stream from a second perspective of the physical environment different from the first perspective; a buffer provided to store the first and second image streams; and an image processing engine provided to generate a 3D reconstruction of the physical environment based on the first and second image streams.

28 Claims, 8 Drawing Sheets

METHOD AND DEVICE FOR GENERATING A 3D RECONSTRUCTION OF A SCENE WITH A HYBRID CAMERA RIG

CROSS-REFERENCE TO RELATED APPLICATIONS

This application claims the benefit of U.S. Provisional Patent Application No. 63/159,342, filed on Mar. 10, 2021, which is herein incorporated by reference in its entirety.

TECHNICAL FIELD

The present disclosure generally relates to generating three-dimensional (3D) reconstructions and, in particular, to methods and systems for generating a 3D reconstruction of a scene with a hybrid camera rig.

BACKGROUND

Video capture with six degrees of freedom (6DOF) for 3D reconstructions and/or extended reality (XR) experiences may be possible with special camera rigs that include a multitude of cameras with different viewpoints. Typical wall or matrix camera configurations may provide 6DOF video capture but may not be capable of capturing a 360-degree scene. In contrast, spherical camera configurations may be capable of capturing a 360-degree scene capture.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
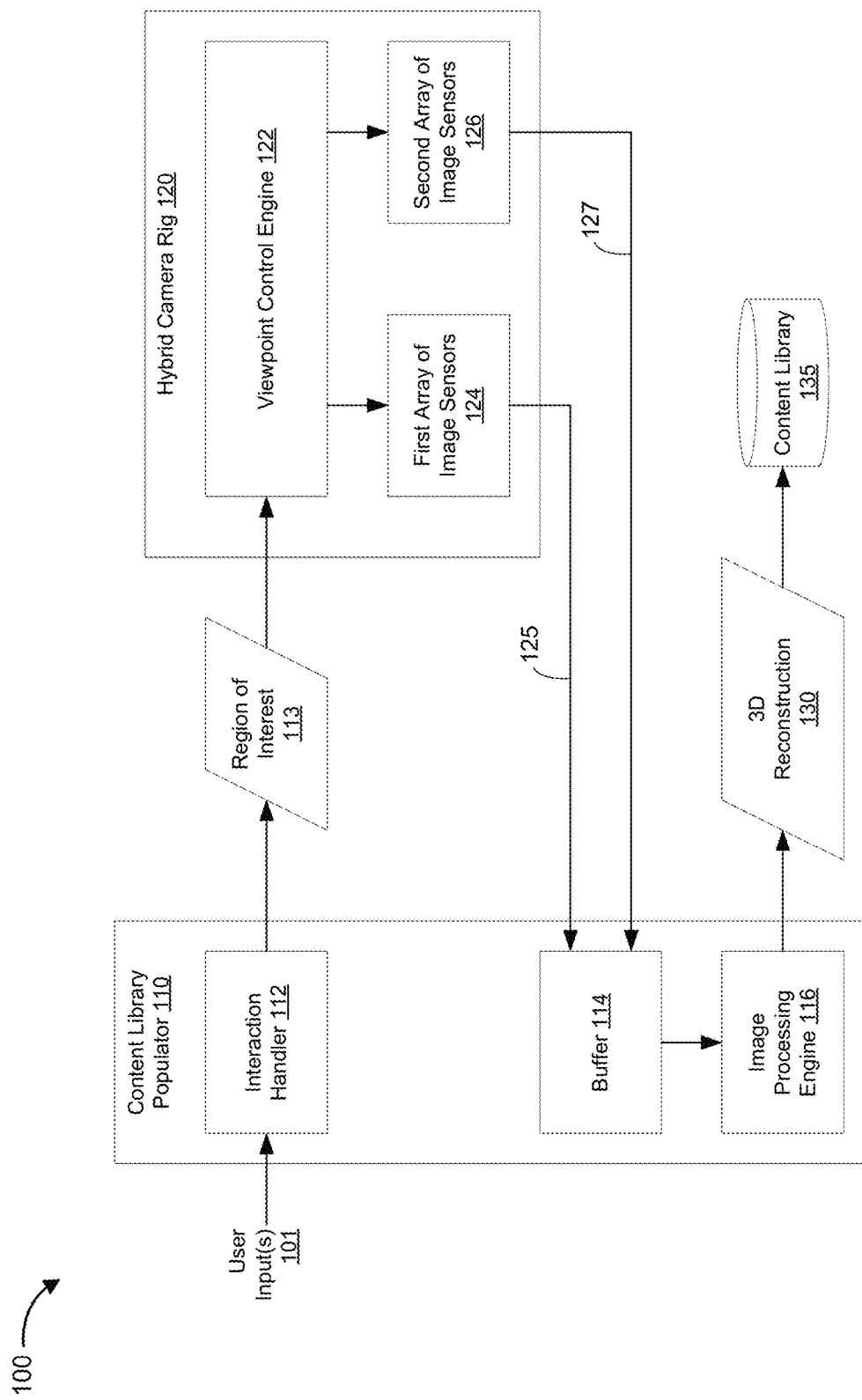
FIG. 1 is a block diagram of an example content capture architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for generating a 3D reconstruction of a scene with a hybrid camera rig. According to some implementations, a camera rig comprises: a first array of image sensors arranged in a planar configuration, wherein the first array of image sensors is provided to capture a first image stream from a first perspective of a physical environment, and wherein the first image stream is associated with six degrees of freedom (DOF), a first quality value, and a first field-of-view (FOV); a second array of image sensors arranged in a non-planar configuration, wherein the second array of image sensors is provided to capture a second image stream from a second perspective of the physical environment different from the first perspective, and wherein the second image stream is associated with a second quality value that is less than the first quality value and a second FOV smaller than the first FOV; a buffer provided to store the first and second image streams; and an image processing engine provided to generate a three-dimensional (3D) reconstruction of the physical environment based on the first and second image streams.

According to some implementations, the method is performed at a computing system including non-transitory memory and one or more processors. The method includes: obtaining a region of interest within a physical environment; aligning a first FOV of a first array of image sensors to the region of interest by moving a hybrid camera rig based on the region of interest, wherein the hybrid camera rig includes the first array of image sensors arranged in a planar configuration and a second array of image sensors arranged in a non-planar configuration; capturing a first image stream with the first array of image sensors and a second image stream with the second array of image sensors, wherein the first image stream is associated with 6DOF, a first quality value, and the first FOV, and wherein the second image stream is associated with a second quality value that is less than the first quality value and a second FOV smaller than the first FOV; generating a 3D reconstruction of the physical environment based on the first image stream and the second image stream; and storing the 3D reconstruction in a content library.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example content capture architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content capture architecture 100 includes a content library populator 110, a hybrid camera rig 120, and a content library 135. In some implementations, the content library populator 110 and the hybrid camera rig 120 are separate entities that each include one or more processors and non-transitory memory. In some implementations, the content library populator 110 and the hybrid camera rig 120 are included in a combined entity that includes one or more processors and non-transitory memory.

As shown in FIG. 1, the hybrid camera rig 120 includes a viewpoint control engine 122 and at least a first array of image sensors 124 and a second array of image sensors 126. In some implementations, the hybrid camera rig 120 is located on (or associated with) an unmanned aerial vehicle (UAV), an aerial or space vehicle, an underwater vehicle, a terrestrial vehicle, a translatable vehicle situated on at least one rail, a locomotable humanoid or robot, and/or the like. In some implementations, the image sensors associated with the first array of image sensors 124 and the second array of image sensors 126 correspond to RGB cameras (e.g., with a complementary metal-oxide-semiconductor (CMOS) image sensor or a charge-coupled device (CCD) image sensor), IR image sensors, event-based cameras, depth sensors (e.g., structured light, time-of-flight, LiDAR, or the like), and/or the like.

Figure 2A:
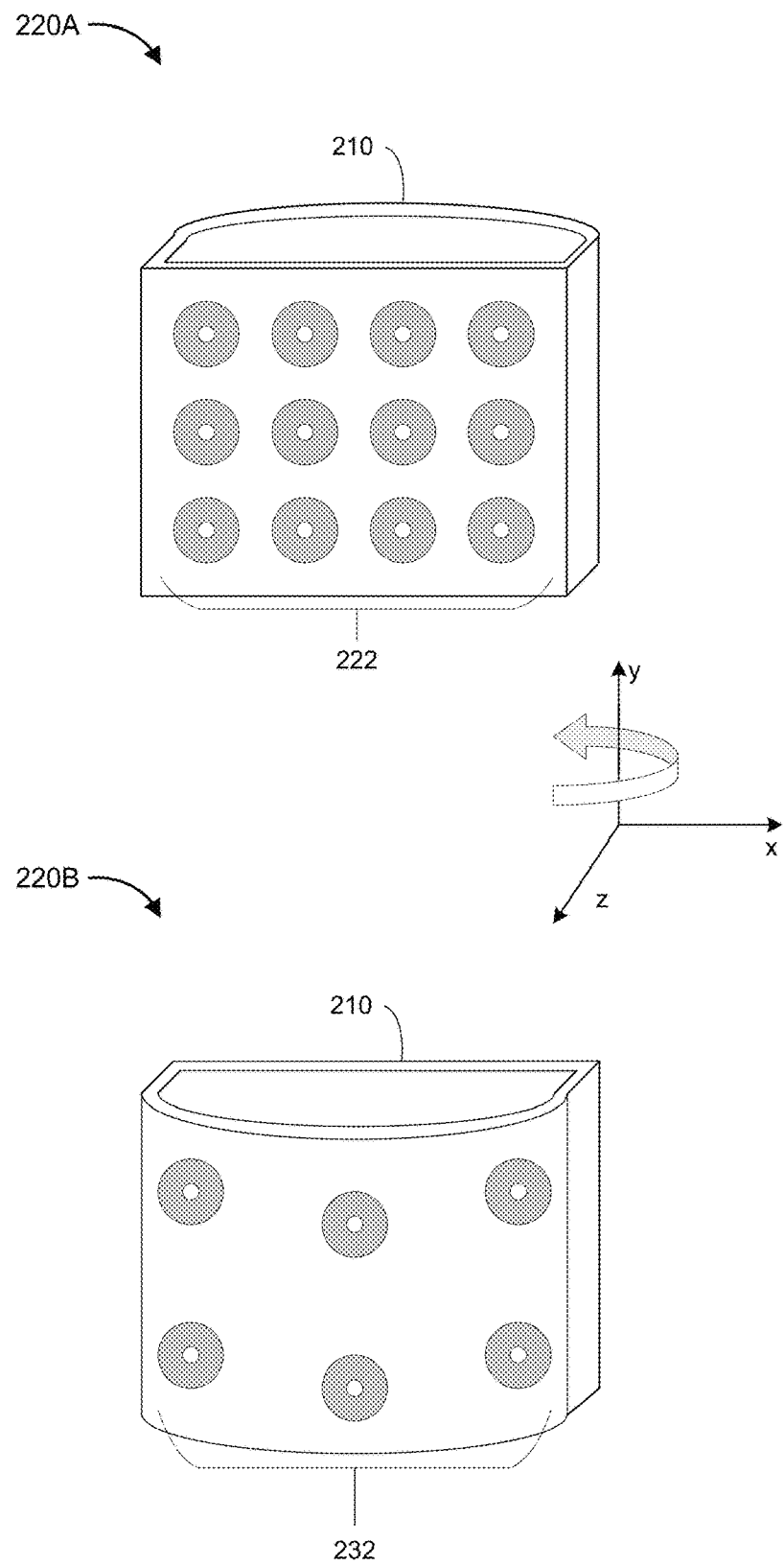
FIG. 2A is an illustration of an example hybrid camera rig in accordance with some implementations.
Figure 2B:
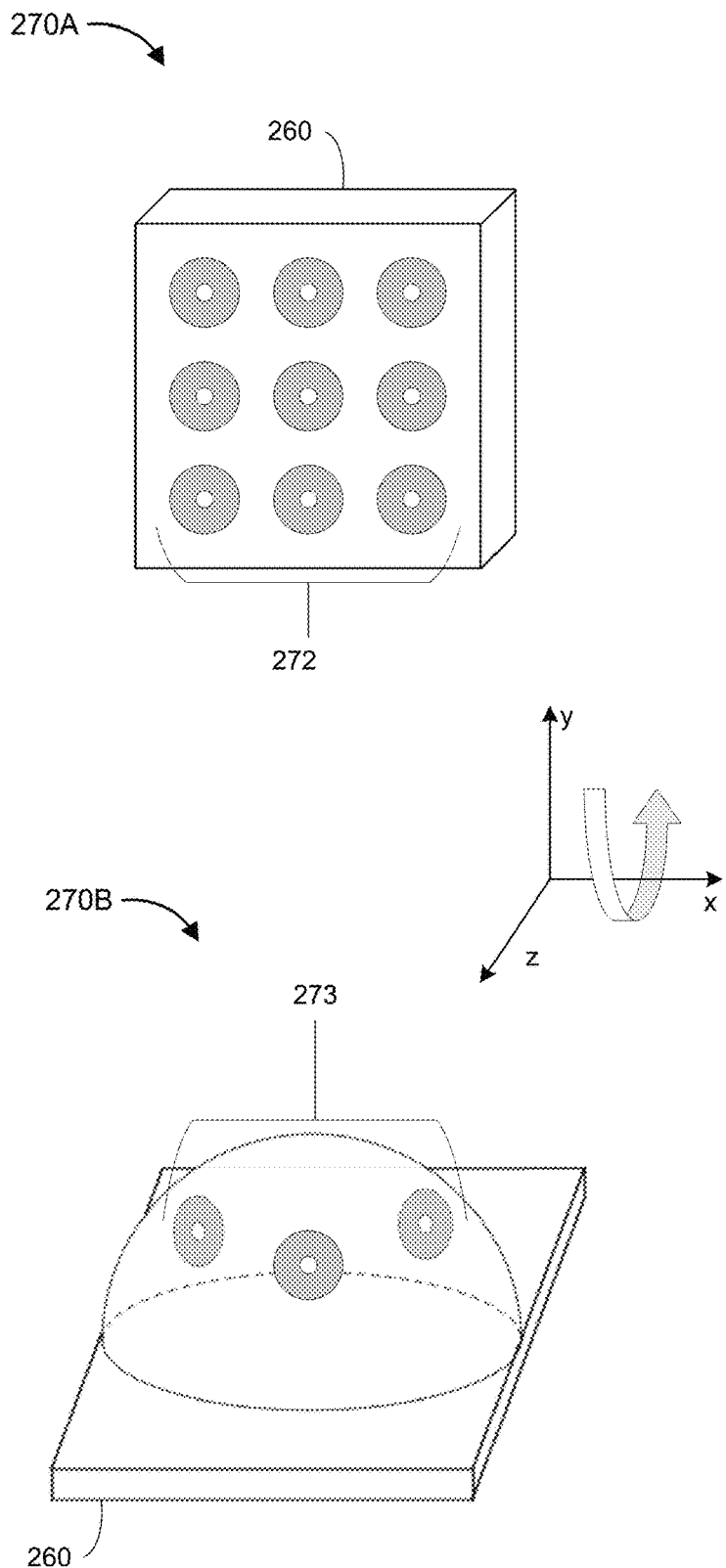
FIG. 2B is an illustration of another example hybrid camera rig in accordance with some implementations.

For example, FIGS. 2A and 2B include example illustrations of the hybrid camera rigs 210 and 260, respectively, (e.g., both are examples of the hybrid camera rig 120 in FIG. 1) with a first array of image sensors in a planar configuration and a second array of image sensors in a non-planar configuration. One of ordinary skill in the art will appreciate that the illustrations in FIGS. 2A and 2B are merely example hybrid camera rigs that may be modified in myriad ways in various other implementations. As such, assuming that the hybrid camera rig includes a first array of image sensors in a planar configuration and a second array of image sensors in a non-planar configuration, the number of image sensors and the layout/placement thereof may be modified in myriad ways.

In some implementations, the first array of image sensors 124 is arranged in a planar configuration. In some implementations, the first array of image sensors 124 is provided to capture a first image stream 125 (and/or a first set of depth maps) from a first perspective of a physical environment. For example, the first image stream 125 is associated with six degrees of freedom (DOF), a first quality value, and a first field-of-view (FOV).

In some implementations, the planar configuration includes a planar surface with the first array of image sensors 124 arranged in an N×M matrix on the planar surface. For example, the first array of image sensors 124 are evenly dispersed in the N×M matrix. As one example, FIG. 2A illustrates a first side 220A of an example hybrid camera rig 210 arranged in a planar configuration with a first set of image sensors 222 located thereon (e.g., a 3×4 matrix of image sensors on a planar surface). As another example, FIG. 2B illustrates a first side 270A of another example hybrid camera rig 260 arranged in a planar configuration with the with a first set of image sensors 272 located thereon (e.g., a 3×3 matrix of image sensors on a planar surface).

In some implementations, the second array of image sensors 126 is arranged in a non-planar configuration. In some implementations, the second array of image sensors 126 is provided to capture a second image stream 127 (and/or a second set of depth maps) from a second perspective of the physical environment different from the first perspective. For example, the second image stream 127 is associated with a second quality value that is less than the first quality value and a second FOV smaller than the first FOV. In some implementations, the second image stream 127 is associated with less than 6DOF. In some implementations, the second image stream 127 is associated with 6DOF. In some implementations, the first FOV is wider than the second FOV. In some implementations, the first FOV is associated with a larger area than the second FOV.

In some implementations, the first quality value is associated with a first resolution, and the second quality value is associated with a second resolution that is lower than the first resolution. In some implementations, the first quality value is associated with a first density (e.g., pixel density), and the second quality value is associated with a second density (e.g., pixel density) that is lower than the first density. In some implementations, the first and second perspectives of the physical environment are offset by at least 90 degrees. In some implementations, the first and second perspectives of the physical environment are offset by 180 degrees. In some implementations, the first and second perspectives of the physical environment may overlap to at least some degree.

In some implementations, the non-planar configuration includes a non-planar surface with the second array of image sensors 126 arranged on a portion of a sphere. For example, the second array of image sensors 126 is arranged on the portion of the sphere with different angular orientations. For example, the second array of image sensors 126 are arranged about a common longitudinal or latitudinal axis on the portion of the sphere. For example, the second array of image sensors 126 are arranged about two or more common longitudinal or latitudinal axes on the portion of the sphere.

In some implementations, the non-planar configuration includes a non-planar surface with the second array of image sensors 126 arranged on a portion of a cylinder. For example, the second array of image sensors 126 is arranged on the portion of the cylinder with different angular orientations. For example, the second array of image sensors 126 is arranged about a common longitudinal or latitudinal axis on the portion of the cylinder. For example, the second array of image sensors 126 is arranged about two or more common longitudinal or latitudinal axes on the portion of the cylinder. As one example, FIG. 2A illustrates a second side 220B of an example hybrid camera rig 210 arranged in a non-planar configuration including a portion of a cylinder or a sphere with the second set of image sensors 232 located thereon. In this example, the first side 220A and the second side 220B are associated with different perspectives, which are offset by 180 degrees (e.g., rotated 180 degrees about the y-axis of the hybrid camera rig 210).

In some implementations, the non-planar configuration includes a planar surface and a portion of a sphere or a cylinder with the second array of image sensors 126 arranged on the portion of the sphere or the cylinder. For example, the second array of image sensors 126 is arranged on the portion of the sphere or the cylinder with different angular orientations. As one example, FIG. 2B illustrates a second side 270B of the hybrid camera rig 260 arranged in a non-planar configuration that includes a planar surface and a portion of a sphere or a cylinder with a second set of image sensors 273 located thereon. In this example, the first side 270A and the second side 270B are associated with different perspectives, which are offset by 90 degrees (e.g., rotated 90 degrees about the x-axis of the hybrid camera rig 260).

In some implementations, the content library populator 110 is configured to populate the content library 135 with 3D reconstructions of scenes based on image streams (and/or depth maps) captured by the hybrid camera rig 120. To this end, in some implementations, the content library populator 110 is communicatively coupled with the hybrid camera rig 120 via one or more wired or wireless communication channels (e.g., BLUETOOTH, IEEE 802.11x, IEEE 802.16x, IEEE 802.3x, etc.). In some implementations, the functions of the content library populator 110 are provided by the hybrid camera rig 120. As such, in some implementations, the components or functions of the content library populator 110 are integrated into the hybrid camera rig 120. For example, the content library populator 110 is a local server located within the same physical environment as the hybrid camera rig 120. In another example, the content library populator 110 is a remote server (e.g., a cloud server, central server, etc.) located outside of the physical environment in which the hybrid camera rig 120 is located.

As shown in FIG. 1, the content library populator 110 includes an interaction handler 112 that obtains (e.g., detects, receives, or retrieves) one or more user inputs 101. For example, the one or more user inputs 101 correspond to gestural inputs, voice inputs, eye tracking inputs, hand tracking inputs, and/or the like selecting an object, an area, and/or the like as the focus of a content capture process. In some implementations, the interaction handler 112 determines a region of interest 113 within the physical environment based on the one or more user inputs 101. As one example, the region of interest 113 corresponds to a bounding box or FOV that encompasses the object, the area, and/or the like selected with the one or more user inputs 101. As another example, the region of interest 113 corresponds to a bounding box or FOV that encompasses an object detected by a motion sensor/tracker, an object whose recognized label is on a list of objects to track, and/or the like.

As shown in FIG. 1, the viewpoint control engine 122 of the hybrid camera rig 120 obtains (e.g., receives, retrieves, etc.) the region of interest 113 from the interaction handler 112. In some implementations, in response to obtaining the region of interest 113, the viewpoint control engine 122 of the hybrid camera rig 120 controls one or more actuatable components (e.g., motors, wheels, joints, propulsion components, and/or the like) of the hybrid camera rig 120 in order to translate and/or rotate the hybrid camera rig 120 such that the FOV of the first array of image sensors 124 corresponds to the region of interest 113. In various implementations, in response to obtaining the region of interest 113, the viewpoint control engine 122 of the hybrid camera rig 120 may also rotate an angular orientation of at least one of the first array of image sensors 124 on a groupwise basis (e.g., as a first unified array) or the second array of image sensors 126 on a groupwise basis (e.g., as a second unified array) based on the region of interest 113. In various implementations, in response to obtaining the region of interest 113, the viewpoint control engine 122 of the hybrid camera rig 120 may also rotate an angular orientation of one or more of the image sensors in the first array of image sensors 124 on an individual basis based on the region of interest 113. In various implementations, in response to obtaining the region of interest 113, the viewpoint control engine 122 of the hybrid camera rig 120 may also rotate an angular orientation of one or more of the image sensors in the second array of image sensors 126 on an individual basis based on the region of interest 113.

As shown in FIG. 1, the content library populator 110 includes a buffer 114 that obtains (e.g., receives, retrieves, etc.) the first image stream 125 (and/or the first set of depth maps) from the first array of image sensors 124 and the second image stream 127 (and/or the second set of depth maps) from the second array of image sensors 126. In some implementations, the first image stream 125 includes the region of interest within the physical environment, and the second image stream 127 includes a background portion of the physical environment.

As shown in FIG. 1, the content library populator 110 includes an image processing engine 116 that generates a 3D reconstruction 130 of the physical environment based on the first image stream 125 and the second image stream 127 stored in the buffer 114. In some implementations, the processing engine 116 generates the 3D reconstruction 130 using known one or more techniques such as multi-view depth estimation, multi-plane image processing, multi-sphere image processing, and/or the like. In some implementations, the 3D reconstruction 130 includes a 360-degree perspective of the physical environment. As shown in FIG. 1, the content library populator 110 stores the 3D reconstruction 130 in a content library 135. In some implementations, the content library 135 is located local relative to the content library populator 110. In some implementations, the content library 135 is located remote from the content library populator 110 (e.g., at a remote server, a cloud server, or the like).

Figure 2C:
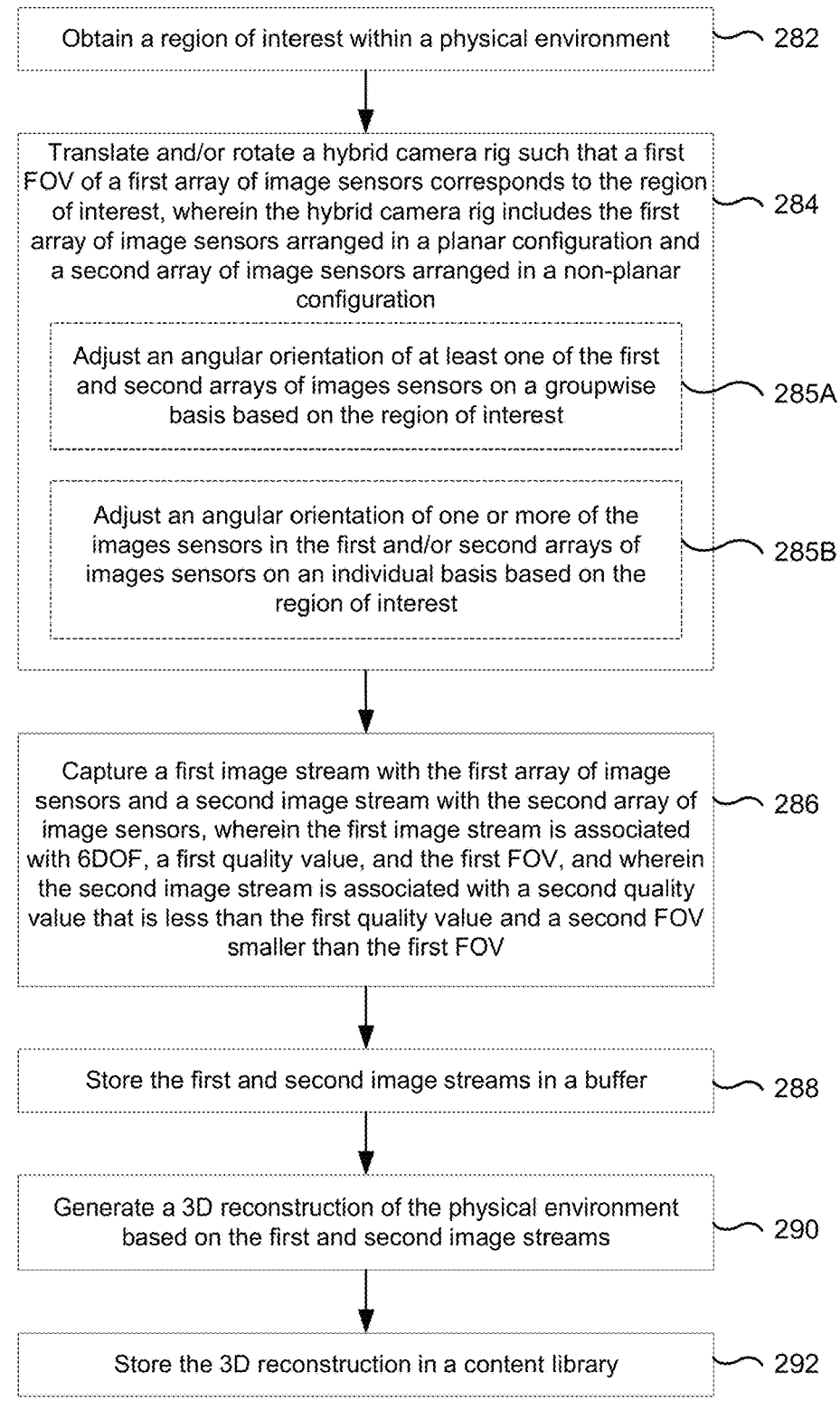
FIG. 2C is a flowchart representation of a method of generating a 3D reconstruction of a scene with a hybrid camera rig in accordance with some implementations.

FIG. 2C is a flowchart representation of a method 280 of generating a 3D reconstruction of a scene with a hybrid camera rig in accordance with some implementations. In various implementations, the method 280 is performed at a computing system including non-transitory memory and one or more processors (e.g., the content library populator 110 in FIG. 1; the hybrid camera rig 120 in FIG. 1; or a suitable combination thereof). In some implementations, the method 280 is performed by processing logic, including hardware, firmware, software, or a combination thereof. In some implementations, the method 280 is performed by a processor executing code stored in a non-transitory computer-readable medium (e.g., a memory).

As discussed above, video capture with 6DOF for 3D reconstructions and/or XR experiences may be possible with special camera rigs that include a multitude of cameras with different viewpoints. Typical wall or matrix camera configurations may provide 6DOF video capture but may not be capable of capturing a 360-degree scene. In contrast, spherical camera configurations may be capable of capturing a 360-degree scene capture. In some circumstances, spherical camera configurations may be limited to 3DOF. However, in some circumstances, spherical camera configurations may be capable of 6DOF capture by using a high density of cameras. As such, in various implementations, a hybrid camera rig combines the aforementioned approaches with a first array of image sensors arranged in a planar configuration (e.g., a matrix of image sensors on a planar surface) and a second array of image sensors arranged in a non-planar configuration (e.g., image sensors on a cylindrical or spherical surface). Therefore, according to some implementations, the camera density of the hybrid camera rig is variable across about at least one of a longitudinal or a latitudinal axis.

As represented by block 282, the method 280 includes obtaining a region of interest within a physical environment. For example, with reference to FIG. 1, the interaction handler 112 determines a region of interest 113 within the physical environment based on the one or more user inputs 101. In some implementations, the computing system or a component thereof (e.g., the interaction handler 112 in FIG. 1) updates the region of interest over time.

As represented by block 284, the method 280 includes translating and/or rotating the hybrid camera rig such that a first field-of-view (FOV) of a first array of image sensors corresponds to the region of interest, wherein the hybrid camera rig includes the first array of image sensors arranged in a planar configuration and a second array of image sensors arranged in a non-planar configuration. For example, with reference to FIG. 1, in response to obtaining the region of interest 113, the viewpoint control engine 122 of the hybrid camera rig 120 controls one or more actuatable components (e.g., motors, wheels, joints, propulsion components, and/or the like) of the hybrid camera rig 120 in order to translate and/or rotate the hybrid camera rig 120 such that the FOV of the first array of image sensors 124 corresponds to the region of interest 113. In some implementations, the hybrid camera rig 120 is located on (or associated with) an unmanned aerial vehicle (UAV), an aerial or space vehicle, an underwater vehicle, a terrestrial vehicle, a translatable vehicle situated on at least one rail, a locomotable humanoid or robot, and/or the like.

As one example, FIG. 2A illustrates a first side 220A of an example hybrid camera rig 210 arranged in a planar configuration with a first set of image sensors 222 located thereon (e.g., a 3×4 matrix of image sensors on a planar surface). As another example, FIG. 2B illustrates a first side 270A of another example hybrid camera rig 260 arranged in a planar configuration with the with a first set of image sensors 272 located thereon (e.g., a 3×3 matrix of image sensors on a planar surface).

As one example, FIG. 2A illustrates a second side 220B of an example hybrid camera rig 210 arranged in a non-planar configuration including a portion of a cylinder or a sphere with the second set of image sensors 232 located thereon. In this example, the first side 220A and the second side 220B are associated with different perspectives, which are offset by 180 degrees. As another example, FIG. 2B illustrates a second side 270B of the hybrid camera rig 260 arranged in a non-planar configuration that includes a planar surface and a portion of a sphere or a cylinder with a second set of image sensors 273 located thereon. In this example, the first side 270A and the second side 270B are associated with different perspectives, which are offset by 90 degrees.

In some implementations, as represented by block 285A, the method 280 includes adjusting an angular orientation of at least one of the first and second arrays of image sensor on a groupwise basis based on the region of interest. For example, with reference to FIG. 1, in response to obtaining the region of interest 113, the viewpoint control engine 122 of the hybrid camera rig 120 may also rotate an angular orientation of at least one of the first array of image sensors 124 on a groupwise basis (e.g., as a first unified array) or the second array of image sensors 126 on a groupwise basis (e.g., as a second unified array) based on the region of interest 113.

In some implementations, as represented by block 285B, the method 280 includes adjusting an angular orientation of one or more of the image sensors in the first and/or second arrays of image sensors on an individual basis based on the region of interest. As one example, with reference to FIG. 1, in response to obtaining the region of interest 113, the viewpoint control engine 122 of the hybrid camera rig 120 may also rotate an angular orientation of one or more of the image sensors in the first array of image sensors 124 on an individual basis based on the region of interest 113. As another example, with reference to FIG. 1, in response to obtaining the region of interest 113, the viewpoint control engine 122 of the hybrid camera rig 120 may also rotate an angular orientation of one or more of the image sensors in the second array of image sensors 126 on an individual basis based on the region of interest 113.

As represented by block 286, the method 280 includes capturing a first image stream (and/or a first set of depth maps) with the first array of image sensors and a second image stream (and/or a second set of depth maps) with the second array of image sensors, wherein the first image stream is associated with six degrees of freedom (6DOF), a first quality value, and the first FOV, and wherein the second image stream is associated with a second quality value that is less than the first quality value and a second FOV smaller than the first FOV. In some implementations, the image sensors associated with the first array of image sensors 124 and the second array of image sensors 126 correspond to RGB cameras (e.g., with a complementary metal-oxide-semiconductor (CMOS) image sensor or a charge-coupled device (CCD) image sensor), IR image sensors, event-based cameras, depth sensors (e.g., structured light, time-of-flight, LiDAR, or the like), and/or the like.

In some implementations, the first quality value is associated with a first resolution, and the second quality value is associated with a second resolution that is lower than the first resolution. In some implementations, the first quality value is associated with a first density (e.g., pixel density), and the second quality value is associated with a second density (e.g., pixel density) that is lower than the first density. In some implementations, the first and second perspectives of the physical environment are offset by at least 90 degrees. In some implementations, the first and second perspectives of the physical environment are offset by 180 degrees.

As represented by block 288, the method 280 includes storing the first and second image streams (and/or the first and second sets of depth maps) in a buffer. For example, with reference to FIG. 1, the buffer 114 obtains (e.g., receives, retrieves, etc.) the first image stream 125 (and/or the first set of depth maps) from the first array of image sensors 124 and the second image stream 127 (and/or the second set of depth maps) from the second array of image sensors 126. In some implementations, the first image stream 125 includes the region of interest 113 within the physical environment, and the second image stream 127 includes a background portion of the physical environment.

As represented by block 290, the method 280 includes generating a 3D reconstruction of the physical environment based on the first and second image streams. In some implementations, the 3D reconstruction includes one or more objects within the physical environment and/or one or more entities/characters performing actions within the physical environment. For example, with reference to FIG. 1, the image processing engine 116 generates a 3D reconstruction 130 of the physical environment based on the first image stream 125 and the second image stream 127 stored in the buffer 114. In some implementations, the 3D reconstruction 130 includes a 360-degree perspective of the physical environment.

Figure 6:
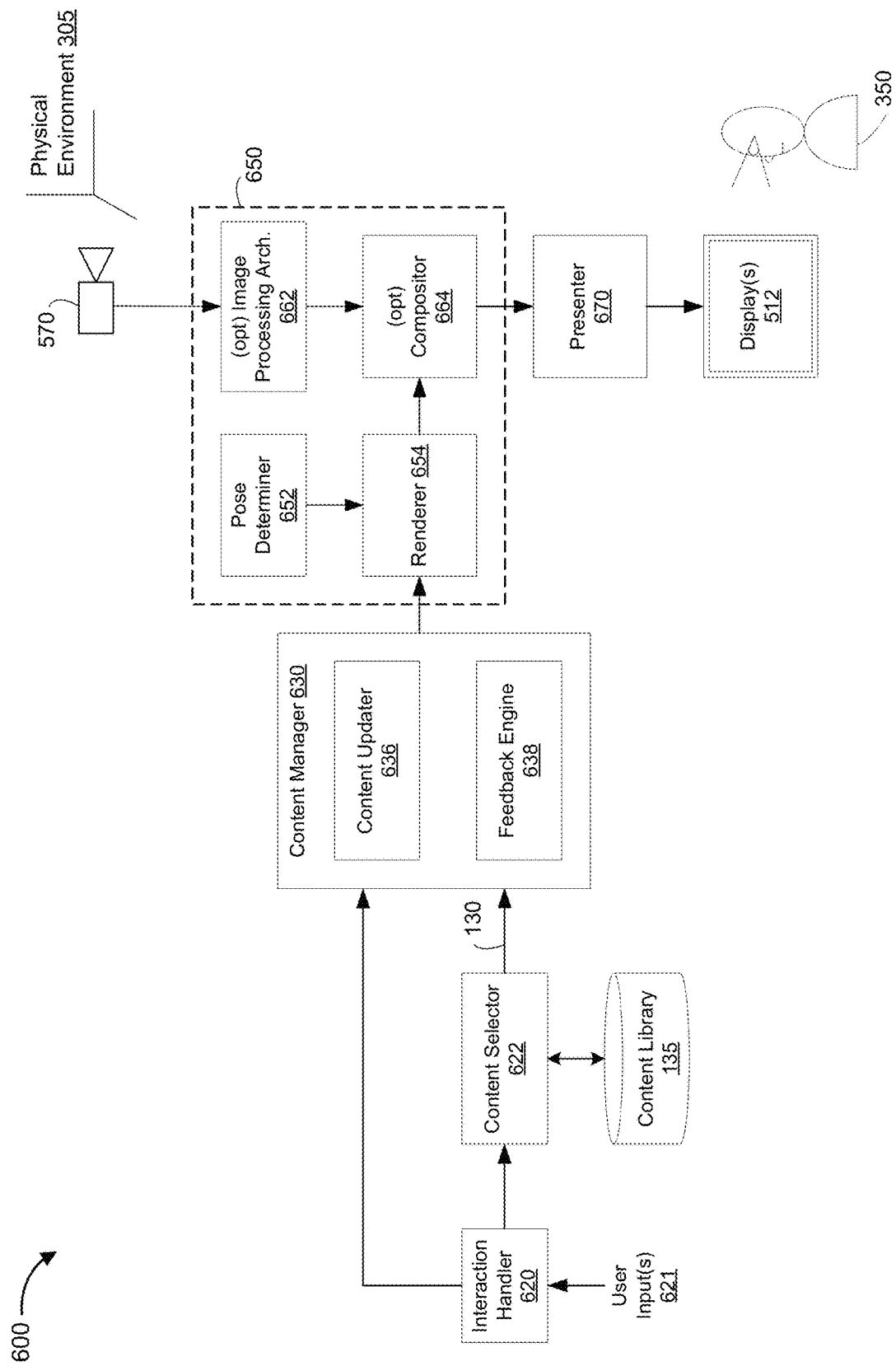
FIG. 6 is a block diagram of an example content delivery architecture in accordance with some implementations.

As represented by block 292, the method 280 includes storing the 3D reconstruction in a content library. For example, with reference to FIG. 1, the content library populator 110 stores the 3D reconstruction 130 in a content library 135. In some implementations, the content library 135 is located local relative to the content library populator 110. In some implementations, the content library 135 is located remote from the content library populator 110 (e.g., at a remote server, a cloud server, or the like). As shown in FIG. 6, the content library 135 is accessible to the content delivery architecture 600 during playback or runtime.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
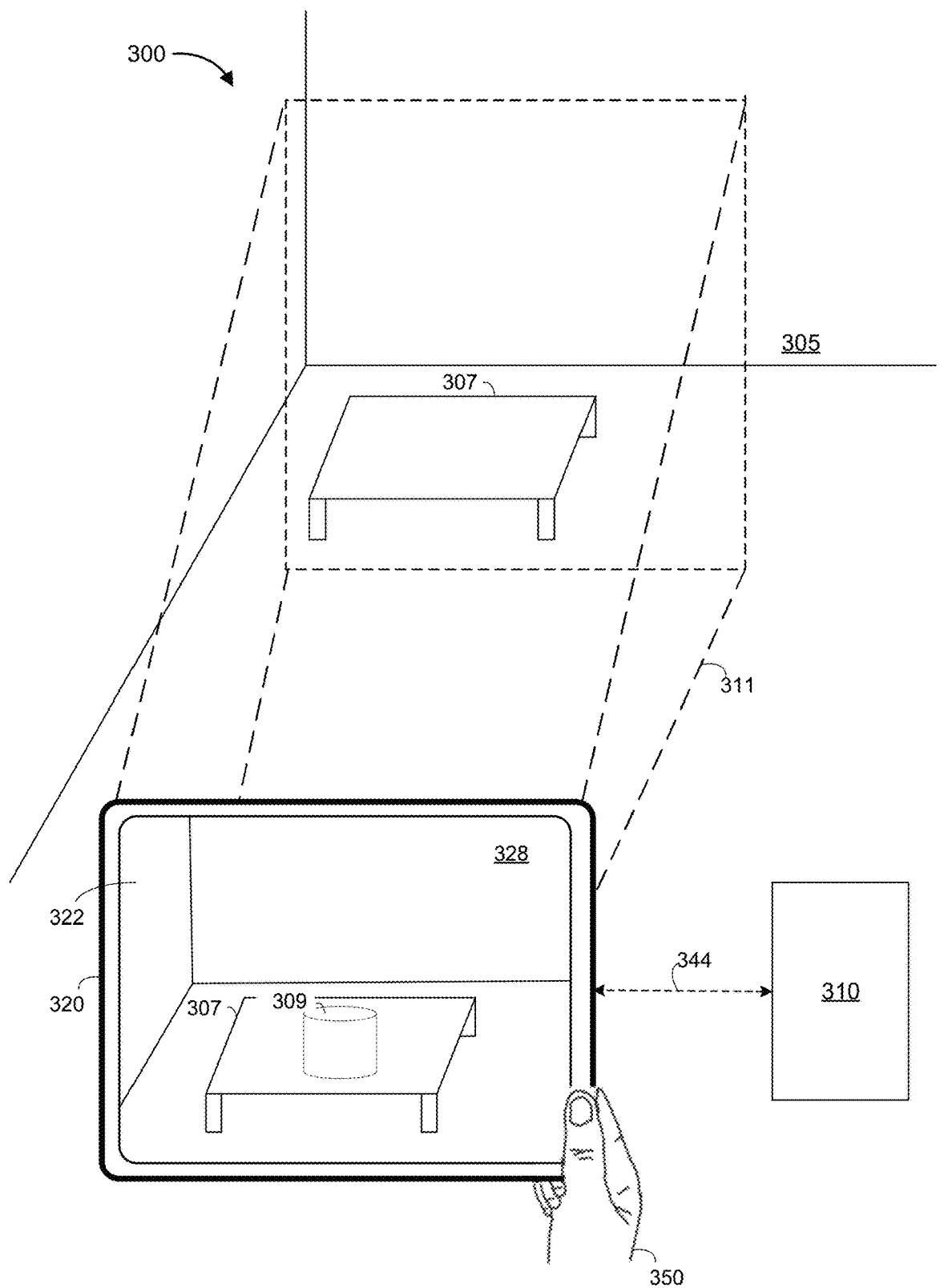
FIG. 3 is a block diagram of an example operating architecture in accordance with some implementations.

FIG. 3 is a block diagram of an example operating architecture 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 300 includes an optional controller 310 and an electronic device 320 (e.g., a tablet, mobile phone, laptop, near-eye system, wearable computing device, or the like).

In some implementations, the controller 310 is configured to manage and coordinate an XR experience (sometimes also referred to herein as a "XR environment" or a "virtual environment" or a "graphical environment") for a user 350 and zero or more other users. In some implementations, the controller 310 includes a suitable combination of software, firmware, and/or hardware. The controller 310 is described in greater detail below with respect to FIG. 4. In some implementations, the controller 310 is a computing device that is local or remote relative to the physical environment 305. For example, the controller 310 is a local server located within the physical environment 305. In another example, the controller 310 is a remote server located outside of the physical environment 305 (e.g., a cloud server, central server, etc.). In some implementations, the controller 310 is communicatively coupled with the electronic device 320 via one or more wired or wireless communication channels 344 (e.g., BLUETOOTH, IEEE 802.11x, IEEE 802.16x, IEEE 802.3x, etc.). In some implementations, the functions of the controller 310 are provided by the electronic device 320. As such, in some implementations, the components or functions of the controller 310 are integrated into the electronic device 320.

In some implementations, the electronic device 320 is configured to present audio and/or video (A/V) content to the user 350. In some implementations, the electronic device 320 is configured to present a user interface (UI) and/or an XR environment 328 to the user 350. In some implementations, the electronic device 320 includes a suitable combination of software, firmware, and/or hardware. The electronic device 320 is described in greater detail below with respect to FIG. 5.

According to some implementations, the electronic device 320 presents an XR experience to the user 350 while the user 350 is physically present within a physical environment 305 that includes a table 307 within the field-of-view (FOV) 311 of the electronic device 320. As such, in some implementations, the user 350 holds the electronic device 320 in his/her hand(s). In some implementations, while presenting the XR experience, the electronic device 320 is configured to present XR content (sometimes also referred to herein as "graphical content" or "virtual content"), including an XR cylinder 309, and to enable video pass-through of the physical environment 305 (e.g., including the table 307) on a display 322. For example, the XR environment 328, including the XR cylinder 309, is volumetric or three-dimensional (3D).

In one example, the XR cylinder 309 corresponds to display-locked content such that the XR cylinder 309 remains displayed at the same location on the display 322 as the FOV 311 changes due to translational and/or rotational movement of the electronic device 320. As another example, the XR cylinder 309 corresponds to world-locked content such that the XR cylinder 309 remains displayed at its origin location as the FOV 311 changes due to translational and/or rotational movement of the electronic device 320. As such, in this example, if the FOV 311 does not include the origin location, the XR environment 328 will not include the XR cylinder 309. For example, the electronic device 320 corresponds to a near-eye system, mobile phone, tablet, laptop, wearable computing device, or the like.

In some implementations, the display 322 corresponds to an additive display that enables optical see-through of the physical environment 305 including the table 307. For example, the display 322 corresponds to a transparent lens, and the electronic device 320 corresponds to a pair of glasses worn by the user 350. As such, in some implementations, the electronic device 320 presents a user interface by projecting the XR content (e.g., the XR cylinder 309) onto the additive display, which is, in turn, overlaid on the physical environment 305 from the perspective of the user 350. In some implementations, the electronic device 320 presents the user interface by displaying the XR content (e.g., the XR cylinder 309) on the additive display, which is, in turn, overlaid on the physical environment 305 from the perspective of the user 350.

In some implementations, the user 350 wears the electronic device 320 such as a near-eye system. As such, the electronic device 320 includes one or more displays provided to display the XR content (e.g., a single display or one for each eye). For example, the electronic device 320 encloses the FOV of the user 350. In such implementations, the electronic device 320 presents the XR environment 328 by displaying data corresponding to the XR environment 328 on the one or more displays or by projecting data corresponding to the XR environment 328 onto the retinas of the user 350.

In some implementations, the electronic device 320 includes an integrated display (e.g., a built-in display) that displays the XR environment 328. In some implementations, the electronic device 320 includes a head-mountable enclosure. In various implementations, the head-mountable enclosure includes an attachment region to which another device with a display can be attached. For example, in some implementations, the electronic device 320 can be attached to the head-mountable enclosure. In various implementations, the head-mountable enclosure is shaped to form a receptacle for receiving another device that includes a display (e.g., the electronic device 320). For example, in some implementations, the electronic device 320 slides/snaps into or otherwise attaches to the head-mountable enclosure. In some implementations, the display of the device attached to the head-mountable enclosure presents (e.g., displays) the XR environment 328. In some implementations, the electronic device 320 is replaced with an XR chamber, enclosure, or room configured to present XR content in which the user 350 does not wear the electronic device 320.

In some implementations, the controller 310 and/or the electronic device 320 cause an XR representation of the user 350 to move within the XR environment 328 based on movement information (e.g., body pose data, eye tracking data, hand/limb/finger/extremity tracking data, etc.) from the electronic device 320 and/or optional remote input devices within the physical environment 305. In some implementations, the optional remote input devices correspond to fixed or movable sensory equipment within the physical environment 305 (e.g., image sensors, depth sensors, infrared (IR) sensors, event cameras, microphones, etc.). In some implementations, each of the remote input devices is configured to collect/capture input data and provide the input data to the controller 310 and/or the electronic device 320 while the user 350 is physically within the physical environment 305. In some implementations, the remote input devices include microphones, and the input data includes audio data associated with the user 350 (e.g., speech samples). In some implementations, the remote input devices include image sensors (e.g., cameras), and the input data includes images of the user 350. In some implementations, the input data characterizes body poses of the user 350 at different times. In some implementations, the input data characterizes head poses of the user 350 at different times. In some implementations, the input data characterizes hand tracking information associated with the hands of the user 350 at different times. In some implementations, the input data characterizes the velocity and/or acceleration of body parts of the user 350 such as his/her hands. In some implementations, the input data indicates joint positions and/or joint orientations of the user 350. In some implementations, the remote input devices include feedback devices such as speakers, lights, or the like.

Figure 4:
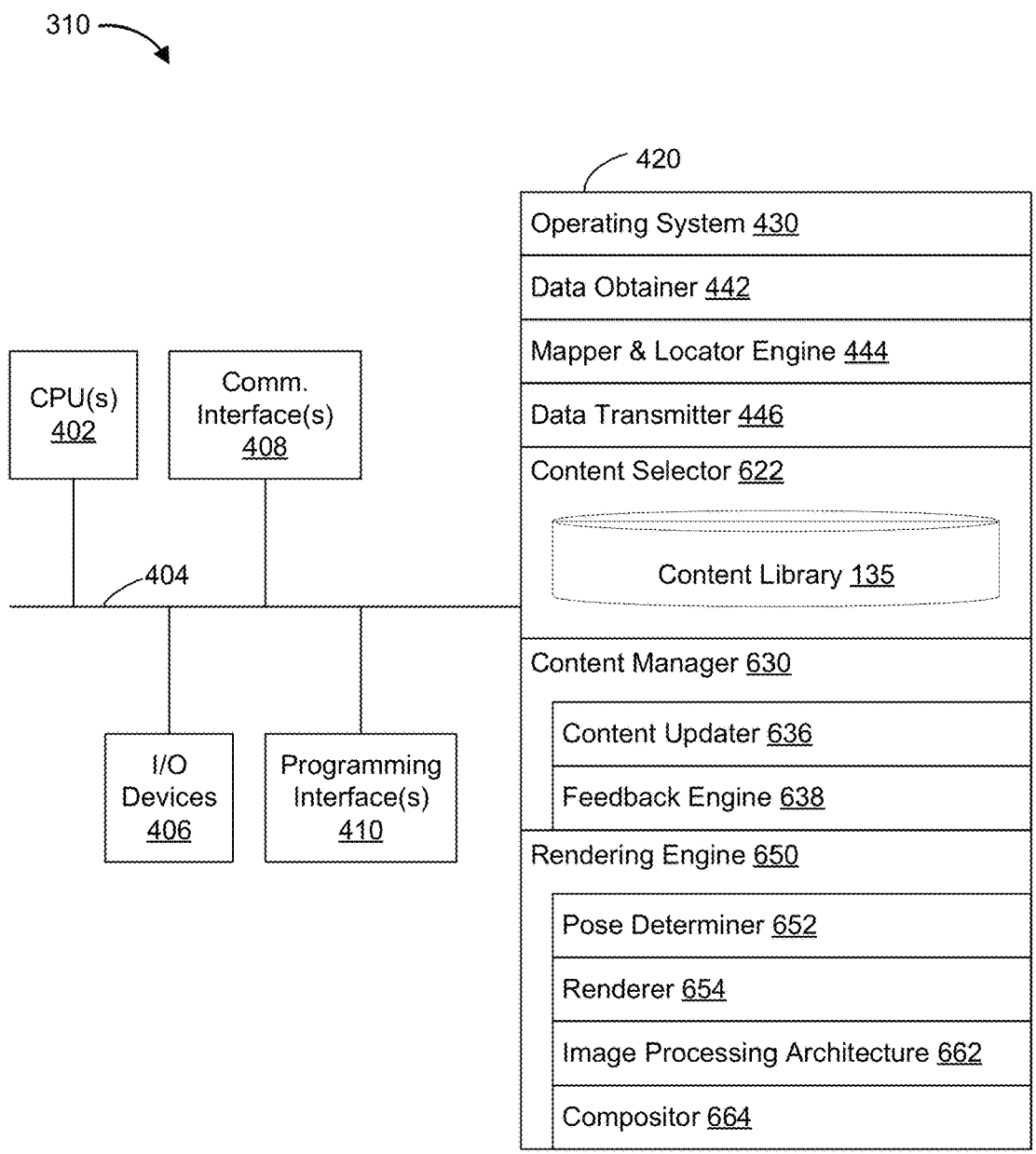
FIG. 4 is a block diagram of an example controller in accordance with some implementations.

FIG. 4 is a block diagram of an example of the controller 310 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 310 includes one or more processing units 402 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 406, one or more communication interfaces 408 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 410, a memory 420, and one or more communication buses 404 for interconnecting these and various other components.

In some implementations, the one or more communication buses 404 include circuitry that interconnects and controls communications between system components. In some implementations, the one or more I/O devices 406 include at least one of a keyboard, a mouse, a touchpad, a touchscreen, a joystick, one or more microphones, one or more speakers, one or more image sensors, one or more displays, and/or the like.

The memory 420 includes high-speed random-access memory, such as dynamic random-access memory (DRAM), static random-access memory (SRAM), double-data-rate random-access memory (DDR RAM), or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof described below with respect to FIG. 4. The operating system 430 includes procedures for handling various basic system services and for performing hardware dependent tasks.

In some implementations, a data obtainer 442 is configured to obtain data (e.g., captured image frames of the physical environment 305, presentation data, input data, user interaction data, camera pose tracking information, eye tracking information, head/body pose tracking information, hand/limb/finger/extremity tracking information, sensor data, location data, etc.) from at least one of the I/O devices 406 of the controller 310, the I/O devices and sensors 406 of the electronic device 320, and the optional remote input devices. To that end, in various implementations, the data obtainer 442 includes instructions and/or logic therefor, and heuristics and metadata therefor.

In some implementations, a mapper and locator engine 444 is configured to map the physical environment 305 and to track the position/location of at least the electronic device 320 or the user 350 with respect to the physical environment 305. To that end, in various implementations, the mapper and locator engine 444 includes instructions and/or logic therefor, and heuristics and metadata therefor.

In some implementations, a data transmitter 446 is configured to transmit data (e.g., presentation data such as rendered image frames associated with the XR environment, location data, etc.) to at least the electronic device 320 and optionally one or more other devices. To that end, in various implementations, the data transmitter 446 includes instructions and/or logic therefor, and heuristics and metadata therefor.

In some implementations, the content selector 622 is configured to select flat audio/visual (A/V) content, a 3D reconstruction captured by the content capture architecture 100 in FIG. 1, an avatar or virtual agent, and/or other XR content (sometimes also referred to herein as "graphical content" or "virtual content") from the content library 135 based on one or more user requests and/or inputs (e.g., gestural or hand tracking inputs, eye tracking inputs, a voice command, a selection from a user interface (UI) menu, and/or the like). To that end, in various implementations, the content selector 622 includes instructions and/or logic therefor, and heuristics and metadata therefor.

In some implementations, the content library 135 includes a plurality of content items such as flat A/V content, 3D reconstructions captured by the content capture architecture 100 in FIG. 1, avatars or virtual agents, and/or other XR content such as objects, items, scenery, etc. In some implementations, the content library 135 is pre-populated or manually authored by the user 350. In some implementations, the content library 135 is located local relative to the controller 310. In some implementations, the content library 135 is located remote from the controller 310 (e.g., at a remote server, a cloud server, or the like).

In some implementations, a content manager 630 is configured to manage and update the layout, setup, structure, and/or the like for the XR environment 328 including one or more of a 3D reconstruction captured by the content capture architecture 100 in FIG. 1, other XR content, one or more user interface (UI) elements associated with the XR content, and/or the like. The content manager 630 is described in more detail below with reference to FIG. 6. To that end, in various implementations, the content manager 630 includes instructions and/or logic therefor, and heuristics and metadata therefor. In some implementations, the content manager 630 includes a content updater 636 and a feedback engine 638.

In some implementations, the content updater 636 is configured to update the XR environment 328 over time based on user interactions (e.g., rotating, translating, scaling, changing, etc. the XR content) with the XR environment 328 and or the like. To that end, in various implementations, the content updater 636 includes instructions and/or logic therefor, and heuristics and metadata therefor.

In some implementations, a feedback engine 638 is configured to generate sensory feedback (e.g., visual feedback such as text or lighting changes, audio feedback, haptic feedback, etc.) associated with the user interactions with and/or changes to the XR environment 328. To that end, in various implementations, the feedback engine 638 includes instructions and/or logic therefor, and heuristics and metadata therefor.

In some implementations, a rendering engine 650 is configured to render an XR environment 328 (sometimes also referred to herein as a "graphical environment" or "virtual environment") or image frame associated therewith as well as the XR content, one or more UI elements associated with the XR content, and/or the like. To that end, in various implementations, the rendering engine 650 includes instructions and/or logic therefor, and heuristics and metadata therefor. In some implementations, the rendering engine 650 includes a pose determiner 652, a renderer 654, an optional image processing architecture 662, and an optional compositor 664. One of ordinary skill in the art will appreciate that the optional image processing architecture 662 and the optional compositor 664 may be present for video pass-through configuration but may be removed for fully VR or optical see-through configurations.

In some implementations, the pose determiner 652 is configured to determine a current camera pose of the electronic device 320 and/or the user 350 relative to the A/V content and/or the XR content. To that end, in various implementations, the pose determiner 652 includes instructions and/or logic therefor, and heuristics and metadata therefor.

In some implementations, the renderer 654 is configured to render the A/V content and/or the XR content according to the current camera pose relative thereto. To that end, in various implementations, the renderer 654 includes instructions and/or logic therefor, and heuristics and metadata therefor.

In some implementations, the image processing architecture 662 is configured to obtain (e.g., receive, retrieve, or capture) an image stream including one or more images of the physical environment 305 from the current camera pose of the electronic device 320 and/or the user 350. In some implementations, the image processing architecture 662 is also configured to perform one or more image processing operations on the image stream such as warping, color correction, gamma correction, sharpening, noise reduction, white balance, and/or the like. To that end, in various implementations, the image processing architecture 662 includes instructions and/or logic therefor, and heuristics and metadata therefor.

In some implementations, the compositor 664 is configured to composite the rendered A/V content and/or XR content with the processed image stream of the physical environment 305 from the image processing architecture 662 to produce rendered image frames of the XR environment 328 for display. To that end, in various implementations, the compositor 664 includes instructions and/or logic therefor, and heuristics and metadata therefor.

Although the data obtainer 442, the mapper and locator engine 444, the data transmitter 446, the content selector 622, the content manager 630, and the rendering engine 650 are shown as residing on a single device (e.g., the controller 110), it should be understood that in other implementations, any combination of the data obtainer 442, the mapper and locator engine 444, the data transmitter 446, the content selector 622, the content manager 630, and the rendering engine 650 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
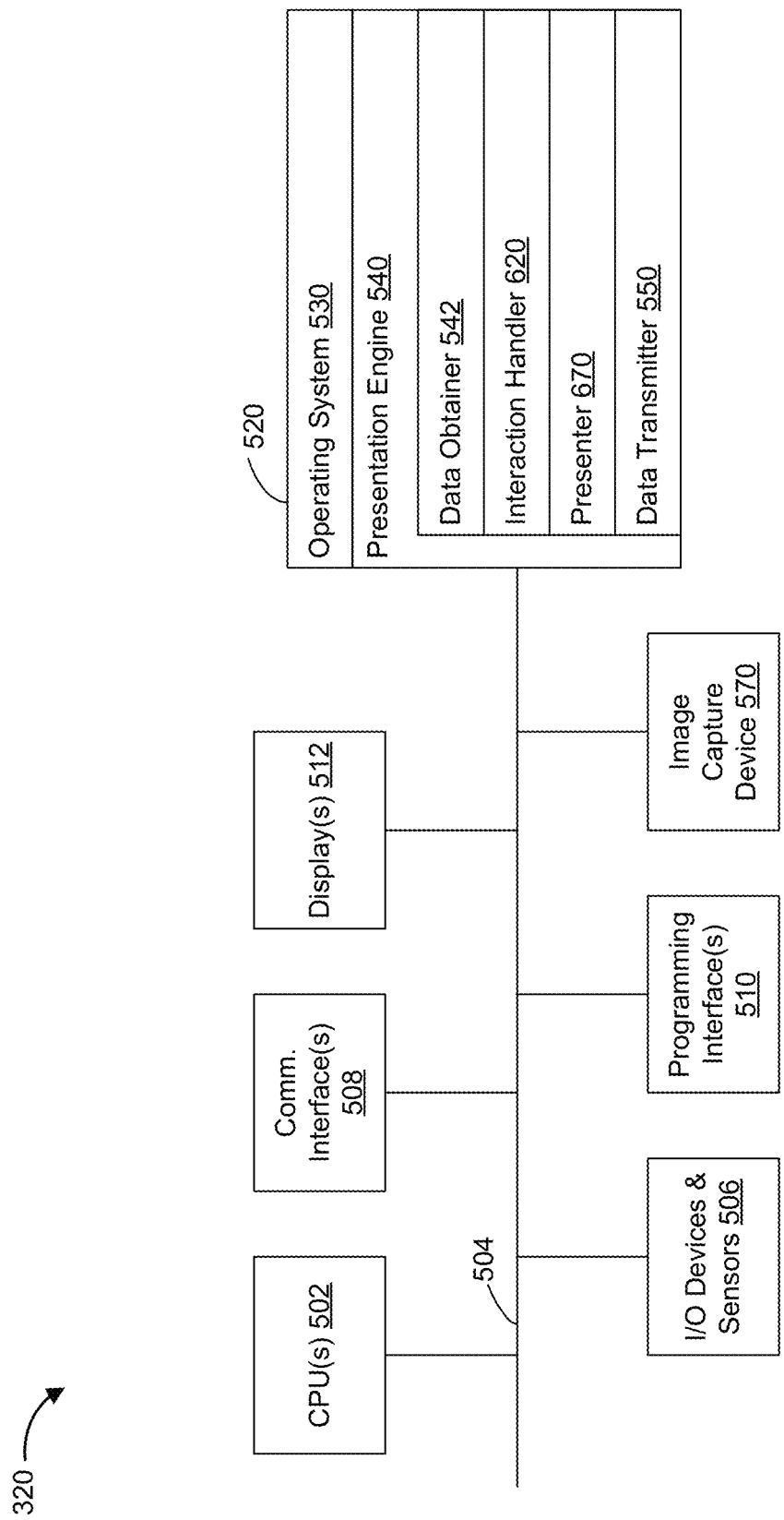
FIG. 5 is a block diagram of an example electronic device in accordance with some implementations.

FIG. 5 is a block diagram of an example of the electronic device 320 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 320 includes one or more processing units 502 (e.g., microprocessors, ASICs, FPGAs, GPUs, CPUs, processing cores, and/or the like), one or more input/output (I/O) devices and sensors 506, one or more communication interfaces 508 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 510, one or more displays 512, an image capture device 570 (e.g., one or more optional interior- and/or exterior-facing image sensors), a memory 520, and one or more communication buses 504 for interconnecting these and various other components.

In some implementations, the one or more communication buses 504 include circuitry that interconnects and controls communications between system components. In some implementations, the one or more I/O devices and sensors 506 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, or the like.

In some implementations, the one or more displays 512 are configured to present the XR environment to the user. In some implementations, the one or more displays 512 are also configured to present flat video content to the user (e.g., a 2-dimensional or "flat" AVI, FLV, WMV, MOV, MP4, or the like file associated with a TV episode or a movie, or live video pass-through of the physical environment 305). In some implementations, the one or more displays 512 correspond to touchscreen displays. In some implementations, the one or more displays 512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 512 correspond to diffractive, reflective, polarized, holographic, etc. waveguide displays. For example, the electronic device 320 includes a single display. In another example, the electronic device 320 includes a display for each eye of the user. In some implementations, the one or more displays 512 are capable of presenting AR and VR content. In some implementations, the one or more displays 512 are capable of presenting AR or VR content.

In some implementations, the image capture device 570 correspond to one or more RGB cameras (e.g., with a CMOS image sensor or a CCD image sensor), IR image sensors, event-based cameras, and/or the like. In some implementations, the image capture device 570 includes a lens assembly, a photodiode, and a front-end architecture. In some implementations, the image capture device 570 includes exterior-facing and/or interior-facing image sensors.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and a presentation engine 540.

The operating system 530 includes procedures for handling various basic system services and for performing hardware dependent tasks. In some implementations, the presentation engine 540 is configured to present media items and/or XR content to the user via the one or more displays 512. To that end, in various implementations, the presentation engine 540 includes a data obtainer 542, an interaction handler 620, a presenter 670, and a data transmitter 550.

In some implementations, the data obtainer 542 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 506 of the electronic device 320, the controller 310, and the remote input devices. To that end, in various implementations, the data obtainer 542 includes instructions and/or logic therefor, and heuristics and metadata therefor.

In some implementations, the interaction handler 620 is configured to detect user interactions with the presented A/V content and/or XR content (e.g., gestural inputs detected via hand tracking, eye gaze inputs detected via eye tracking, voice commands, etc.). To that end, in various implementations, the interaction handler 620 includes instructions and/or logic therefor, and heuristics and metadata therefor.

In some implementations, the presenter 670 is configured to present and update A/V content and/or XR content (e.g., the rendered image frames associated with the user interface or the XR environment 328 including the XR content, one or more UI elements associated with the XR content, and/or the like) via the one or more displays 512. To that end, in various implementations, the presenter 670 includes instructions and/or logic therefor, and heuristics and metadata therefor.

In some implementations, the data transmitter 550 is configured to transmit data (e.g., presentation data, location data, user interaction data, head tracking information, camera pose tracking information, eye tracking information, hand/limb/finger/extremity tracking information, etc.) to at least the controller 310. To that end, in various implementations, the data transmitter 550 includes instructions and/or logic therefor, and heuristics and metadata therefor.

Although the data obtainer 542, the interaction handler 620, the presenter 670, and the data transmitter 550 are shown as residing on a single device (e.g., the electronic device 120), it should be understood that in other implementations, any combination of the data obtainer 542, the interaction handler 620, the presenter 670, and the data transmitter 550 may be located in separate computing devices.

Moreover, FIG. 5 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 6 is a block diagram of an example content delivery architecture 600 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture 600 is included in a computing system with one or more processors and non-transitory memory such as the controller 310 shown in FIGS. 3 and 4; the electronic device 320 shown in FIGS. 3 and 5; and/or a suitable combination thereof.

According to some implementations, the interaction handler 620 obtains (e.g., receives, retrieves, or detects) one or more user inputs 621 provided by the user 350 that are associated with selecting A/V content, a 3D reconstruction captured by the content capture architecture 100 in FIG. 1, avatars or virtual agents, and/or other XR content for presentation. For example, the one or more user inputs 321 correspond to a gestural input selecting a 3D reconstruction captured by the content capture architecture 100 in FIG. 1 from a UI menu detected via hand tracking, an eye gaze input selecting the 3D reconstruction captured by the content capture architecture 100 in FIG. 1 from the UI menu detected via eye tracking, a voice command selecting the 3D reconstruction captured by the content capture architecture 100 in FIG. 1 from the UI menu detected via a microphone, and/or the like. In some implementations, the content selector 622 selects the 3D reconstruction 130 captured by the content capture architecture 100 in FIG. 1 from the content library 135 based on one or more user inputs 621 (e.g., a voice command, a selection from a UI menu, and/or the like).

In various implementations, the content manager 630 manages and updates the layout, setup, structure, and/or the like for the XR environment 328 including one or more of the 3D reconstruction 130, other XR content, one or more user interface (UI) elements associated with the XR content or the 3D reconstruction 130, and/or the like. To that end, the content manager 630 includes the content updater 636 and the feedback engine 638.

In some implementations, the content updater 636 updates the XR environment 328 over time based on user interactions with the XR environment 328. In some implementations, the feedback engine 638 generates sensory feedback (e.g., visual feedback such as text or lighting changes, audio feedback, haptic feedback, etc.) associated with the user interactions with and/or changes to the XR environment 328.

According to some implementations, the pose determiner 652 determines a current camera pose of the electronic device 320 and/or the user 350 relative to the XR environment 328 and/or the physical environment 305. In some implementations, the renderer 654 renders the 3D reconstruction 130, other XR content, one or more UI elements associated with the XR content the 3D reconstruction 130, and/or the like.

According to some implementations, the optional image processing architecture 662 obtains an image stream from an image capture device 570 including one or more images of the physical environment 305 from the current camera pose of the electronic device 320 and/or the user 350. In some implementations, the image processing architecture 662 also performs one or more image processing operations on the image stream such as warping, color correction, gamma correction, sharpening, noise reduction, white balance, and/or the like. In some implementations, the optional compositor 664 composites the rendered content with the processed image stream of the physical environment 305 from the image processing architecture 662 to produce rendered image frames of the XR environment 328. In various implementations, the presenter 670 presents the rendered image frames of the XR environment 328 to the user 350 via the one or more displays 512. One of ordinary skill in the art will appreciate that the optional image processing architecture 662 and the optional compositor 664 may not be applicable for fully virtual environments (or optical see-through scenarios).

In some implementations, the one or more displays 512 correspond to a transparent lens assembly, and wherein the rendered content (e.g., the 3D reconstruction 130, other XR content, one or more UI elements associated with the XR content the 3D reconstruction 130, and/or the like) is projected onto the transparent lens assembly. In some implementations, the one or more displays 512 correspond to a near-eye system, and wherein presenting the content includes compositing the rendered content (e.g., the 3D reconstruction 130, other XR content, one or more UI elements associated with the XR content the 3D reconstruction 130, and/or the like) with one or more images of a physical environment captured by an exterior-facing image sensor. In some implementations, the XR environment corresponds to AR content overlaid on the physical environment. In one example, the XR environment is associated with an optical see-through configuration. In another example, the XR environment is associated with a video pass-through configuration. In some implementations, the XR environment corresponds a VR environment with VR content.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A camera rig comprising:
   a first array of image sensors arranged in a planar configuration, wherein the first array of image sensors is provided to capture a first image stream from a first perspective of a physical environment, and wherein the first image stream is associated with six degrees of freedom (6DOF), a first quality value, and a first field-of-view (FOV);
   a second array of image sensors arranged in a non-planar configuration, wherein the second array of image sensors is provided to capture a second image stream from a second perspective of the physical environment different from the first perspective, and wherein the second image stream is associated with a second quality value that is less than the first quality value and a second FOV smaller than the first FOV;
   a buffer provided to store the first and second image streams; and
   an image processing engine provided to generate a three-dimensional (3D) reconstruction of the physical environment based on the first and second image streams.

2. The camera rig of claim 1, wherein the non-planar configuration includes a non-planar surface with the second array of image sensors arranged on a portion of a sphere.

3. The camera rig of claim 2, wherein the second array of image sensors is arranged on the portion of the sphere with different angular orientations.

4. The camera rig of claim 1, wherein the non-planar configuration includes a non-planar surface with the second array of image sensors arranged on a portion of a cylinder.

5. The camera rig of claim 4, wherein the second array of image sensors is arranged on the portion of the cylinder with different angular orientations.

6. The camera rig of claim 1, wherein the non-planar configuration includes a planar surface and a portion of a sphere or a cylinder with the second array of image sensors arranged on the portion of the sphere or the cylinder.

7. The camera rig of claim 6, wherein the second array of image sensors is arranged on the portion of the sphere or the cylinder with different angular orientations.

8. The camera rig of claim 1, wherein the planar configuration includes a planar surface with the first array of image sensors arranged in an N×M matrix on the planar surface.

9. The camera rig of claim 8, wherein the first array of image sensors is associated with similar angular orientations.

10. The camera rig of claim 1, wherein the first image stream includes a region of interest within the physical environment and the second image stream includes a background of the physical environment.

11. The camera rig of claim 1, wherein the second image stream is associated with 6DOF.

12. The camera rig of claim 1, wherein the second image stream is associated with less than 6DOF.

13. The camera rig of claim 1, wherein the first and second perspectives of the physical environment are offset by 180 degrees.

14. The camera rig of claim 1, wherein the first and second perspectives of the physical environment are offset by at least 90 degrees.

15. The camera rig of claim 1, wherein the 3D reconstruction includes a 360-degree perspective of the physical environment.

16. The camera rig of claim 1, wherein the first quality value corresponds to a higher density or a higher resolution than the second quality value.

17. The camera rig of claim 1, wherein the camera rig includes a viewpoint control engine provided to rotate an angular orientation of at least one of the first array of image sensors or the second array of image sensors.

18. The camera rig of claim 1, wherein the camera rig is located on one of an unmanned aerial vehicle (UAV), a translatable device that is situated on at least one rail, a terrestrial vehicle, an underwater vehicle, or a locomotable humanoid or robot.

19. A method comprising:
at a computing system including non-transitory memory, one or more processors, and an interface for communicating with a hybrid camera rig, a display device, and one or more input devices:
obtaining a region of interest within a physical environment;
aligning a first field-of-view (FOV) of a first array of image sensors to the region of interest by moving a hybrid camera rig based on the region of interest, wherein the hybrid camera rig includes the first array of image sensors arranged in a planar configuration and a second array of image sensors arranged in a non-planar configuration;
capturing a first image stream with the first array of image sensors and a second image stream with the second array of image sensors, wherein the first image stream is associated with six degrees of freedom (6DOF), a first quality value, and the first FOV, and wherein the second image stream is associated with a second quality value that is less than the first quality value and a second FOV smaller than the first FOV;
generating a three-dimensional (3D) reconstruction of the physical environment based on the first image stream and the second image stream; and
storing the 3D reconstruction in a content library.

20. The method of claim 19, wherein moving the hybrid camera rig includes at least one of translating or rotating the hybrid camera rig based on the region of interest by controlling one or more actuatable components of the hybrid camera rig.

21. The method of claim 19, further comprising:
adjusting an angular orientation of at least one of the first array of image sensors or the second array of image sensors based on the region of interest.

22. The method of claim 19, further comprising:
adjusting an angular orientation of one or more of the image sensors in the first or second arrays of image sensors on an individual basis based on the region of interest.

23. The method of claim 19, further comprising:
detecting, via the one or more input devices, a user input that corresponds selecting the 3D reconstruction from the content library and presenting the 3D reconstruction; and
in response to detecting the user input, presenting, via the display device, the 3D reconstruction.

24. A non-transitory memory storing one or more programs, which, when executed by one or more processors of a computing system with an interface for communicating with a hybrid camera rig, a display device, and one or more input devices, cause the computing system to:
obtain a region of interest within a physical environment;
align a first field-of-view (FOV) of a first array of image sensors to the region of interest by moving a hybrid camera rig based on the region of interest, wherein the hybrid camera rig includes the first array of image sensors arranged in a planar configuration and a second array of image sensors arranged in a non-planar configuration;
capture a first image stream with the first array of image sensors and a second image stream with the second array of image sensors, wherein the first image stream is associated with six degrees of freedom (6DOF), a first quality value, and the first FOV, and wherein the second image stream is associated with a second quality value that is less than the first quality value and a second FOV smaller than the first FOV;
generate a three-dimensional (3D) reconstruction of the physical environment based on the first image stream and the second image stream; and
store the 3D reconstruction in a content library.

25. The non-transitory memory of claim 24, wherein moving the hybrid camera rig includes at least one of translating or rotating the hybrid camera rig based on the region of interest by controlling one or more actuatable components of the hybrid camera rig.

26. The non-transitory memory of claim 24, wherein the one or more programs further cause the computing system to:
adjust an angular orientation of at least one of the first array of image sensors or the second array of image sensors based on the region of interest.

27. The non-transitory memory of claim 24, wherein the one or more programs further cause the computing system to:
adjust an angular orientation of one or more of the image sensors in the first or second arrays of image sensors on an individual basis based on the region of interest.

28. The non-transitory memory of claim 24, wherein the one or more programs further cause the computing system to:

detect, via the one or more input devices, a user input that corresponds selecting the 3D reconstruction from the content library and presenting the 3D reconstruction; and in response to detecting the user input, present, via the display device, the 3D reconstruction.

\* \* \* \* \*